United States Patent
Chang et al.

(10) Patent No.: US 9,398,659 B2
(45) Date of Patent: Jul. 19, 2016

(54) INTEGRATED LIGHT EMITTING DIODE LAMP AND DATA TRANSMISSION CIRCUIT AND SYNCHRONIZATION CIRCUIT THEREOF

(71) Applicant: Generalplus Technology Inc., Hsinchu (TW)

(72) Inventors: Yu-Chung Chang, Hsinchu (TW); Wen-Ching Chu, Hsinchu (TW)

(73) Assignee: GeneralPlus Technology Inc., Hsinchu (TW)

(*) Notice: Subject to any disclaimer, the term of this patent is extended or adjusted under 35 U.S.C. 154(b) by 92 days.

(21) Appl. No.: 14/534,738

(22) Filed: Nov. 6, 2014

(65) Prior Publication Data

US 2015/0181668 A1 Jun. 25, 2015

Related U.S. Application Data

(60) Provisional application No. 61/919,569, filed on Dec. 20, 2013.

(51) Int. Cl.
*G05F 1/00* (2006.01)
*H05B 33/08* (2006.01)

(52) U.S. Cl.
CPC ................ *H05B 33/0842* (2013.01)

(58) Field of Classification Search
USPC .................. 315/291, 294, 160, 162
See application file for complete search history.

(56) References Cited

U.S. PATENT DOCUMENTS

| | | | | |
|---|---|---|---|---|
| 6,054,703 | A | * 4/2000 | Liu | H04N 9/045 250/208.1 |
| 2006/0140037 | A1 | * 6/2006 | Lovett | G01K 1/02 365/222 |
| 2011/0069094 | A1 | * 3/2011 | Knapp | G09G 3/2003 345/690 |

* cited by examiner

*Primary Examiner* — Minh D A
(74) *Attorney, Agent, or Firm* — Muncy, Geissler, Olds & Lowe, PC

(57) ABSTRACT

An integrated LED lamp and a data transmission circuit and a synchronization circuit thereof are provided. Integrated LEDs of the present invention only need two pins, such that the originally existing LED package method can be adopted. In addition, by using two pins, the present invention can synchronize the LEDs or further update a displayed pattern. Because the old package technology has been well developed, the present invention can avoid the risk of the yield reduction caused by the new package technology in addition to reductions of the wire and the manufacturing cost.

18 Claims, 16 Drawing Sheets

US 9,398,659 B2

INTEGRATED LIGHT EMITTING DIODE LAMP AND DATA TRANSMISSION CIRCUIT AND SYNCHRONIZATION CIRCUIT THEREOF

This application claims priority to U.S. Provisional Patent Application Ser. No. 61/919,569, filed Dec. 20, 2013 which is incorporated herein by reference in its entirety.

BACKGROUND OF THE INVENTION

1. Field of the Invention

The present invention relates to the technology of integrating light-emitting diodes (LEDs), and more particularly to an integrated LED lamp, and a data transmission circuit and a synchronization circuit thereof.

2. Related Art

Because the technology is changing with each passing day, incandescent light bulbs frequently used among lamps have been gradually replaced with light-emitting diodes (LEDs). Furthermore, the conventional Christmas lamp, stage lamp and advertising billboard lamp originally using the incandescent light bulb and neon lamp are also gradually replaced by the LEDs. The Christmas lamp, stage lamp and advertising billboard lamp have one property that the lamps flicker with a predetermined rule. That is, the on and off states of the lamp have to be controlled using an additional circuit.

In order to reduce the size of the lamp, three colors of LEDs have been integrated into one single LED integrated with a drive circuit. FIG. 1 is a circuit diagram showing a conventional integrated LED. As shown in FIG. 1, the pins of the integrated LED include a positive power pin PV+, a negative power pin PV− and data pins DI and DO. FIG. 2 is a package diagram showing a conventional integrated LED. As shown in FIG. 2, the package forms may be classified into a through-hole package 201 and a surface mount technology (SMT) 202.

However, four pins require a lot of package costs, and the original LED package cannot be used.

SUMMARY OF THE INVENTION

An object of the present invention is to provide an integrated LED lamp, in which multiple colors of LEDs are integrated and the original two-pin package can be used.

Another object of the present invention is to provide a synchronization circuit for controlling synchronization of the two-pin integrated LED lamp.

Still another object of the present invention is to provide a data transmission circuit using power pins to transmit a pattern to be displayed by the integrated LED lamp.

In view of this, the present invention provides an integrated LED lamp including a first power pin, a second power pin and a LED package. The first power pin is coupled to a first power voltage. The second power pin is coupled to a second power voltage. The LED package includes a first LED, a second LED, a synchronization starting circuit, an oscillator, a counter, an image memory cell and a drive circuit. The first LED is for outputting first color light. The second LED is for outputting second color light. The synchronization starting circuit is coupled to the first power pin and the second power pin. The oscillator is for providing a clock signal. The counter is coupled to the oscillator and the synchronization starting circuit and counts according to the clock signal to generate an address signal. The image memory cell is coupled to the counter, receives the address signal, and provides image data corresponding to the address signal according to the address signal. The drive circuit includes an input port and an output port. The input port of the drive circuit is coupled to the image memory cell and receives the image data. The drive circuit controls an order of lighting the first LED and the second LED according to the image data. The synchronization starting circuit detects voltages/currents of the first power pin and the second power pin. When a difference between the voltages/currents of the first power pin and the second power pin reaches a threshold, the synchronization starting circuit outputs a synchronization starting signal. When the counter receives the synchronization starting signal, the counter resets.

A synchronization circuit for driving N integrated LED lamps is provided, wherein each of N integrated LED lamps includes a first power pin, a second power pin and a LED package. The first power pin is coupled to a first power voltage. The second power pin is coupled to a second power voltage. The LED package includes a first LED, a second LED, a synchronization starting circuit, an oscillator, a counter, an image memory cell and a drive circuit. The first LED is for outputting first color light. The second LED is for outputting second color light. The synchronization starting circuit is coupled to the first power pin and the second power pin. The oscillator is for providing a clock signal. The counter is coupled to the oscillator and the synchronization starting circuit and counts according to the clock signal to generate an address signal. The image memory cell is coupled to the counter, receives the address signal, and provides image data corresponding to the address signal according to the address signal. The drive circuit includes an input port and an output port. The input port of the drive circuit is coupled to the image memory cell and receives the image data. The drive circuit controls an order of lighting the first LED and the second LED according to the image data. The synchronization starting circuit detects voltages/currents of the first power pin and the second power pin. The first power pin of the (I+1)th integrated LED lamp is coupled to the second power pin of the Ith integrated LED lamp.

The synchronization circuit includes a power supply circuit and a voltage/current controller. The input terminal of the voltage/current controller is coupled to the output terminal of the power supply circuit, the output terminal of the voltage/current controller is coupled to the first power pin of the first integrated LED lamp, wherein the voltage/current controller selectively outputs a first voltage/current and a second voltage/current to the N integrated LED lamps. In a normal mode, the voltage/current controller outputs the first voltage/current to drive the N integrated LED lamps. In a synchronous mode, the voltage/current controller outputs the second voltage/current to drive the N integrated LED lamps. When voltages/currents of the first power pin and the second power pin of the at least one specific integrated LED lamp reach the second voltage/current, the synchronization starting circuit of the specific integrated LED lamp outputs a synchronization starting signal. When the counter of the specific integrated LED lamp receives the synchronization starting signal, the counter resets. The voltage/current controller enters the synchronous mode every predetermined time, wherein N and I are natural numbers, and $0 < I <= N$.

A data transmission circuit for driving N integrated LED lamps is provided, wherein each of the integrated LED lamps includes a first power pin, a second power pin and a LED package. The first power pin is coupled to a first power voltage. The second power pin is coupled to a second power voltage. The LED package includes a first LED, a second LED, a data transmission starting circuit, an image memory cell and a drive circuit. The first LED is for outputting first color light. The second LED is for outputting second color light. The data transmission starting circuit is coupled to the first power pin and the second power pin, wherein the data transmission starting circuit detects voltages/currents of the first power pin and the second power pin. The image memory cell is for providing image data. The drive circuit includes an input port and an output port, wherein the input port of the drive circuit is coupled to the image memory cell and receives the image data, wherein the drive circuit controls an order of lighting the first LED and the second LED according to the image data, wherein the first power pin of the (I+1)th integrated LED lamp is coupled to the second power pin of the Ith integrated LED lamp.

The data transmission circuit includes a power supply circuit and a voltage/current controller. The input terminal of the voltage/current controller is coupled to the output terminal of the power supply circuit, and the output terminal of the voltage/current controller is coupled to the first power pin of the first integrated LED lamp, wherein the voltage/current controller selectively outputs a first voltage/current, a second voltage/current, a third voltage/current and a fourth voltage/current to the N integrated LED lamps. In a normal mode, the voltage/current controller outputs the first voltage/current to drive the N integrated LED lamps. In a data receiving mode, the voltage/current controller continuously outputs the second voltage/current in a first period to notify the data transmission starting circuits of the N integrated LED lamps to enter the data receiving mode, and then when to-be-transmitted bit data is first logic, the voltage/current controller outputs the third voltage/current, when the transmitted bit data is second logic, the voltage/current controller outputs the fourth voltage/current, wherein the voltage/current controller outputs the second voltage between the bit data, wherein N and I are natural numbers, and 0<I<=N.

An integrated LED lamp is provided. The integrated LED lamp includes a first power pin, a second power pin and a LED package. The first power pin is coupled to a first power voltage. The second power pin is coupled to a second power voltage. The LED package includes a first LED, a second LED, a data transmission starting circuit, an image memory cell and a drive circuit. The first LED is for outputting first color light. The second LED is for outputting second color light. The data transmission starting circuit coupled to the first power pin and the second power pin, wherein the data transmission starting circuit detects voltages/currents of the first power pin and the second power pin. The image memory cell is coupled to the data transmission starting circuit and provides image data corresponding to an address signal. The drive circuit comprising an input port and an output port, wherein the input port of the drive circuit is coupled to the image memory cell and receives the image data, wherein the drive circuit controls an order of lighting the first LED and the second LED according to the image data.

When a difference between the voltages/currents of the first power pin and the second power pin reaches a threshold for a first period, the data transmission starting circuit outputs a data transmission enable signal. When the difference between the voltages/currents of the first power pin and the second power pin reaches the threshold for the first period, the data transmission starting circuit enters a data receiving mode, and then when the first power pin receives a first voltage/current, the received bit data is judged as first logic, when the first power pin receives a second voltage/current, the received bit data is judged as second logic, and the data transmission starting circuit transmits the received data to the image memory cell.

A data transmission circuit for driving N integrated LED lamps is provided, wherein each of the integrated LED lamps includes a first power pin, a second power pin and a LED package. The first power pin is coupled to a first power voltage. The second power pin is coupled to a second power voltage. The LED package includes a first LED, a second LED, a data transmission starting circuit, an image memory cell and a drive circuit. The first LED is for outputting first color light. The second LED is for outputting second color light. The data transmission starting circuit is coupled to the first power pin and the second power pin, wherein the data transmission starting circuit detects voltages/currents of the first power pin and the second power pin. The image memory cell is for providing image data. The drive circuit includes an input port and an output port, wherein the input port of the drive circuit is coupled to the image memory cell and receives the image data, wherein the drive circuit controls an order of lighting the first LED and the second LED according to the image data, wherein the first power pin of the (I+1)th integrated LED lamp is coupled to the second power pin of the Ith integrated LED lamp.

The data transmission circuit includes a power supply circuit and a voltage/current controller. The input terminal of the voltage/current controller is coupled to the output terminal of the power supply circuit, and the output terminal of the voltage/current controller is coupled to the first power pin of the first integrated LED lamp, wherein the voltage/current controller selectively outputs a first voltage/current and a second voltage/current to the N integrated LED lamps. In a normal mode, the voltage/current controller outputs the first voltage/current to drive the N integrated LED lamps. In a data receiving mode, the voltage/current controller continuously outputs the second voltage/current in a first period to notify the data transmission starting circuits of the N integrated LED lamps to enter the data receiving mode, and then when to-be-transmitted bit data is first logic, the voltage/current controller outputs the second voltage/current in a first period of a clock period and the voltage/current controller outputs the first voltage/current in a second period of the clock period. When the transmitted bit data is second logic, the voltage/current controller outputs the first voltage/current in the first period of the clock period and the voltage/current controller outputs the second voltage/current in the second period of the clock period, wherein N and I are natural numbers, and 0<I<=N.

An integrated LED lamp is provided. The integrated LED lamp includes a first power pin, a second power pin and a LED package. The first power pin is coupled to a first power voltage. The second power pin is coupled to a second power voltage. The LED package includes a first LED, a second LED, a data transmission starting circuit, an image memory cell and a drive circuit. The first LED is for outputting first color light. The second LED is for outputting second color light. The data transmission starting circuit coupled to the first power pin and the second power pin, wherein the data transmission starting circuit detects voltages/currents of the first power pin and the second power pin. The image memory cell is coupled to the data transmission starting circuit and provides image data corresponding to an address signal. The drive circuit comprising an input port and an output port, wherein the input port of the drive circuit is coupled to the image memory cell and receives the image data, wherein the drive circuit controls an order of lighting the first LED and the second LED according to the image data.

When a difference between the voltages/currents of the first power pin and the second power pin reaches a threshold for a first period, the data transmission starting circuit outputs a data transmission enable signal. When the difference between the voltages/currents of the first power pin and the second power pin reaches the threshold for the first period, the data transmission starting circuit enters a data receiving mode, and then, in each of a clock period, the transmission starting circuit detects a variation of the voltage/current. When the first power pin receives a first voltage/current in a first period of a clock period, and the first power pin receives a second voltage/current in a second period of the clock period, the received bit data is judged as first logic. When the first power pin receives the second voltage/current in the first period of the clock period, and the first power pin receives the first voltage/current in the second period of the clock period, the received bit data is judged as second logic, wherein the data transmission starting circuit transmits the received data to the image memory cell.

The spirit of the present invention resides in that the integrated LED lamp only needs to use two pins to synchronize the LEDs and to further update a displayed pattern. Thus, the integration of multiple colors of LEDs can use the original two-pin package without modifying the package form. The present invention can reduce the wires and decrease the manufacturing cost. In addition, because the old package technology has been well grown, the risk of the yield reduction caused by the new package technology can be avoided.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
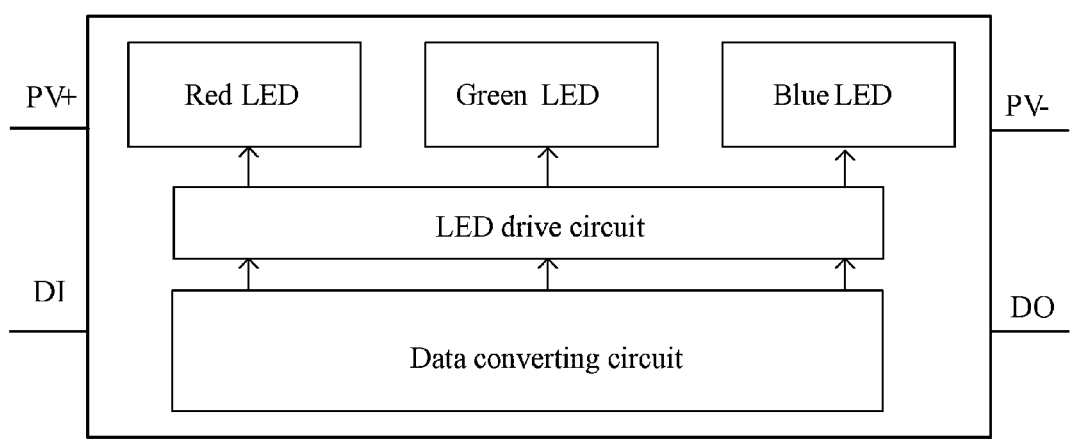
FIG. 1 is a circuit diagram showing a conventional integrated LED.
Figure 2:
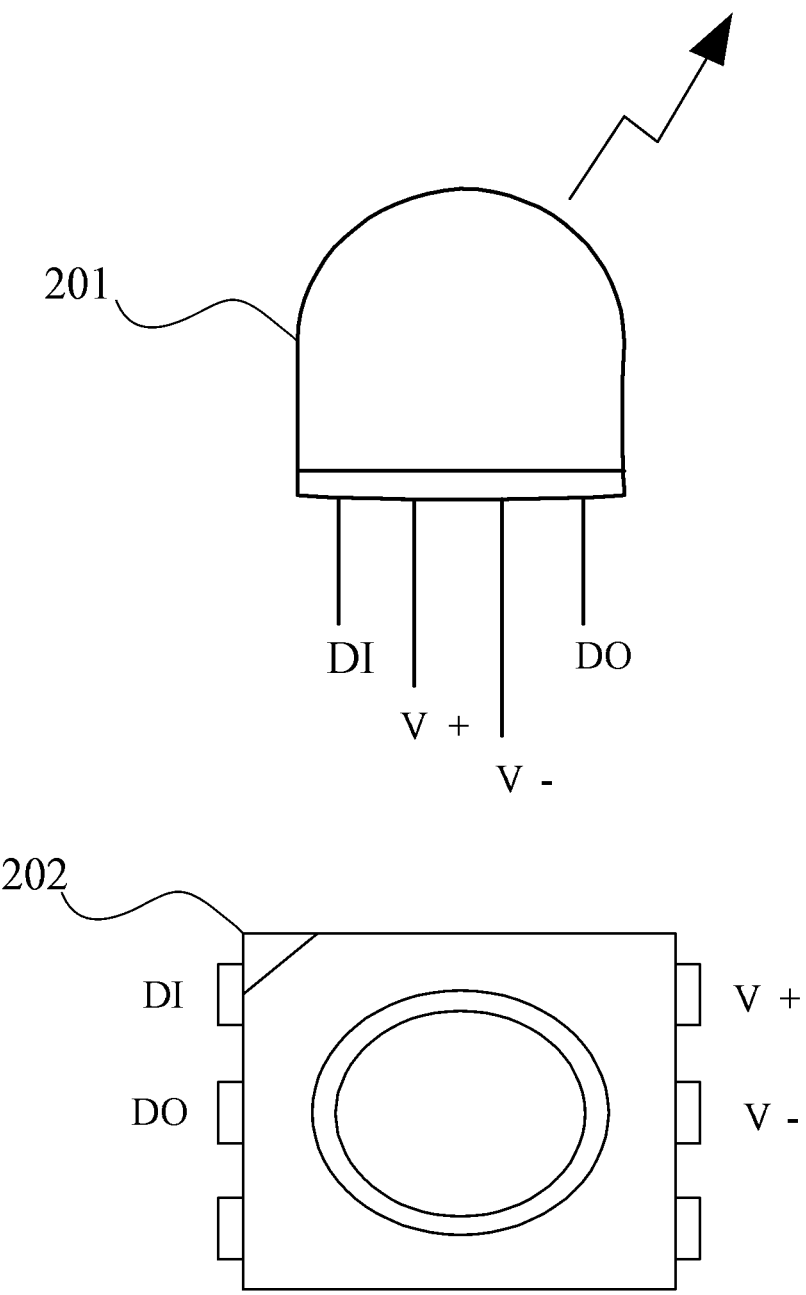
FIG. 2 is a package diagram showing a conventional integrated LED.
Figure 3:
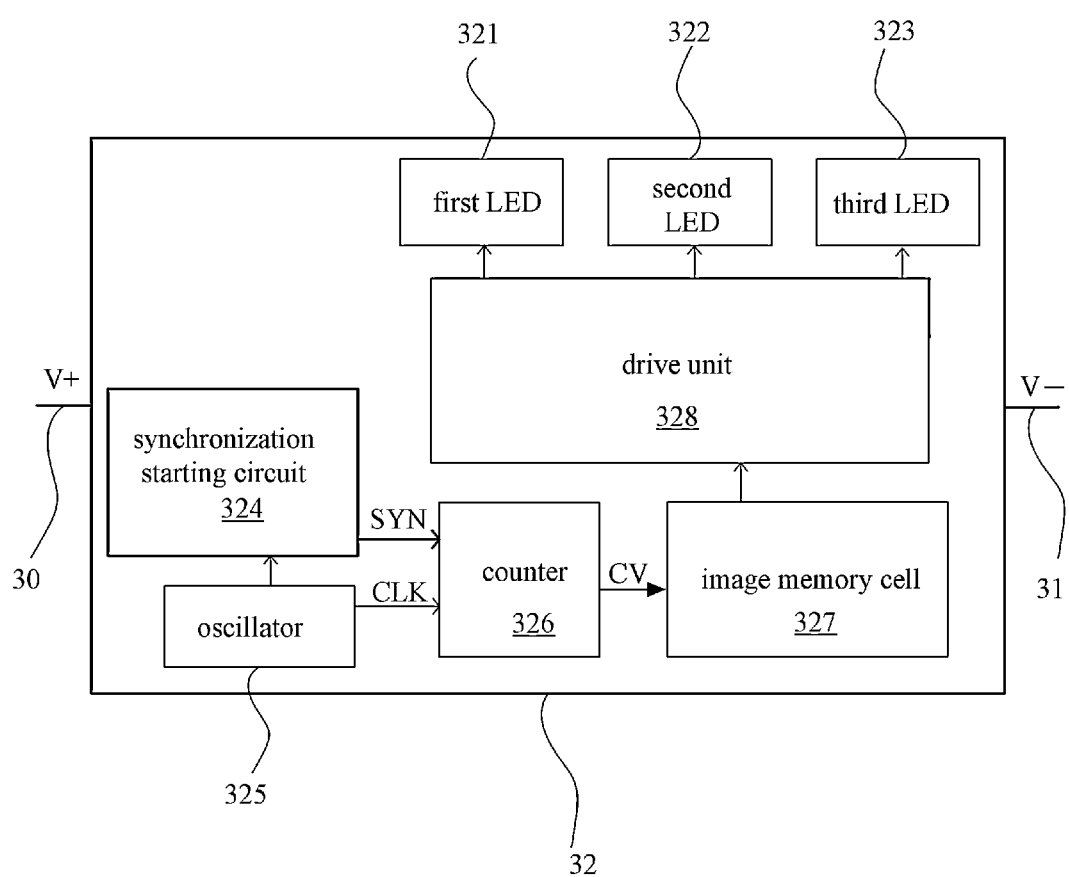
FIG. 3 is a circuit block diagram showing an integrated LED lamp according to a preferred embodiment of the present invention.

FIG. 3 is a circuit block diagram showing an integrated light emitting diode (LED) according to a preferred embodiment of the present invention. Referring to FIG. 3, the integrated LED lamp includes a first power pin 30, a second power pin 31 and a LED package 32. The first power pin 30 is coupled to a first voltage V+. The second power pin 31 is coupled to a second voltage V−. The LED package 32 includes a first LED 321, a second LED 322, a third LED 323, a synchronization starting circuit 324, an oscillator 325, a counter 326, an image memory cell 327 and a drive circuit 328. In this embodiment, the first LED 321, the second LED 322 and the third LED 323 are red, green and blue LEDs, for example. Also, the image memory cell 327 records the lighting/extinguishing order or the lighting brightness of the first LED 321, the second LED 322 and the third LED 323.

Generally speaking, the integrated LED lamp is applied to lamps, such as a Christmas lamp, a stage lamp, an advertising billboard lamp and the like, which needs to cyclically light up. In this example, the image memory cell 327 is implemented by a read only memory (ROM). After the first power pin 30 and the second power pin 31 are coupled to the power, the synchronization starting circuit 324, the oscillator 325, the counter 326, the image memory cell 327 and the drive circuit 328 start to operate. The counter 326 starts to count and outputs a count value CV according to a clock signal CLK outputted from the oscillator 325. The count value CV serves as an address signal of the image memory cell 327. The image memory cell 327 outputs a display image corresponding to the first LED 321, the second LED 322 and the third LED 323 according to an address corresponding to the count value CV. The drive circuit 328 drives the first LED 321, the second LED 322 and the third LED 323 according to the display pattern.

Figure 4:
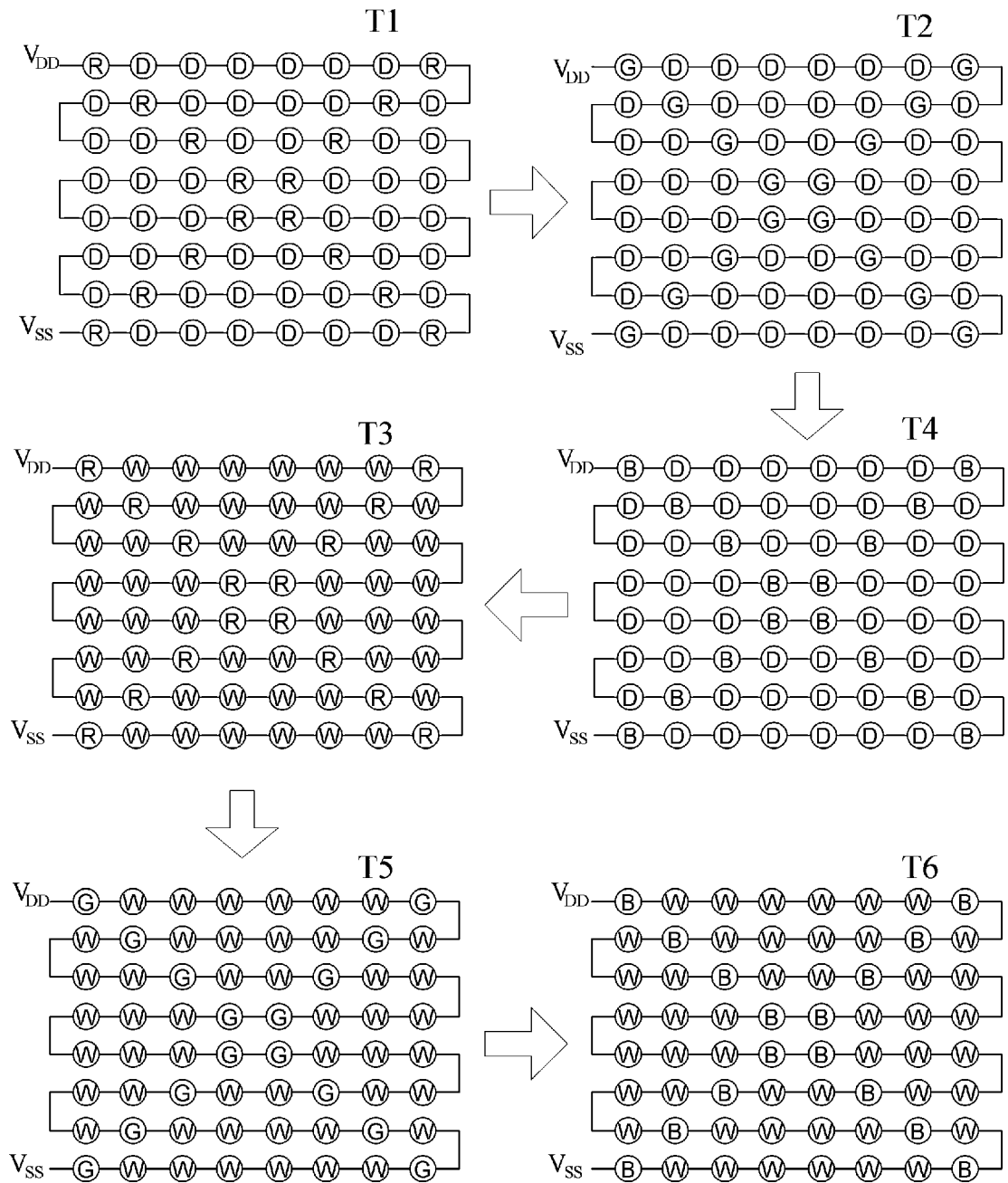
FIG. 4 is a schematic view showing an advertising billboard constituted by integrated LEDs according to a preferred embodiment of the present invention.

Generally speaking, each of the Christmas lamp, the stage lamp and the advertising billboard lamp is not restricted to only one single integrated LED lamp, but may be a combination of multiple integrated LED lamps. FIG. 4 is a schematic view showing an advertising billboard constituted by integrated LEDs according to a preferred embodiment of the present invention. As shown in FIG. 4, the advertising billboard lamp displays a red X word (represented by R) at first time T1, wherein the other integrated LED lamps are black (represented by D); displays a green X word (represented by G) at second time T2, wherein the other integrated LED lamps are black (represented by D); displays a blue X word (represented by B) at third time T3, wherein the other integrated LED lamps are black (represented by D); displays a red X word (represented by R) at fourth time T4, wherein the other integrated LED lamps are white (represented by W); displays a green X word (represented by G) at fifth time T5, wherein the other integrated LED lamps are white (represented by W); and displays a blue X word (represented by B) at sixth time T6, wherein the other integrated LED lamps are white (represented by W).

Figure 5:
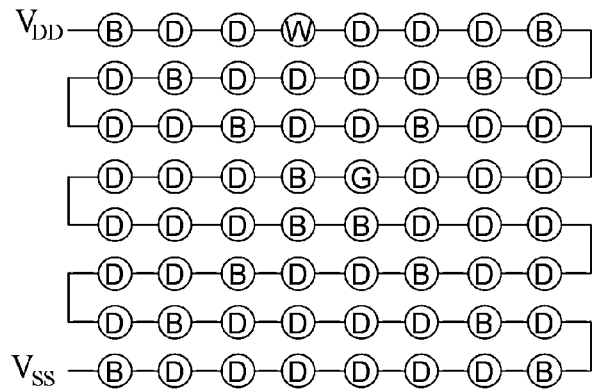
FIG. 5 is a schematic view showing the advertising billboard, which is constituted by integrated LEDs and shows defects according to a preferred embodiment of the present invention.

The display pattern of each integrated LED lamp is recorded in the internal ROM 327, and the display timing control is performed according to the oscillator 325 and the counting of the counter 326. Furthermore, the oscillation frequencies of the oscillators in each integrated LED lamp generally have slight differences. So, when the billboard displays the pattern for a longer time, such as one hour, the phenomenon of FIG. 5 occurs. FIG. 5 is a schematic view showing the advertising billboard, which is constituted by integrated LEDs and shows defects according to a preferred embodiment of the present invention. Referring to FIG. 5, the fourth integrated LED lamp of the first row should originally display the black, but finally displays the white because the frequency of the internal oscillator is higher than the predetermined frequency. In addition, the fifth integrated LED lamp of the fourth row should originally display the blue, but finally displays the green because the frequency of the internal oscillator is lower than the predetermined frequency.

Figure 6:
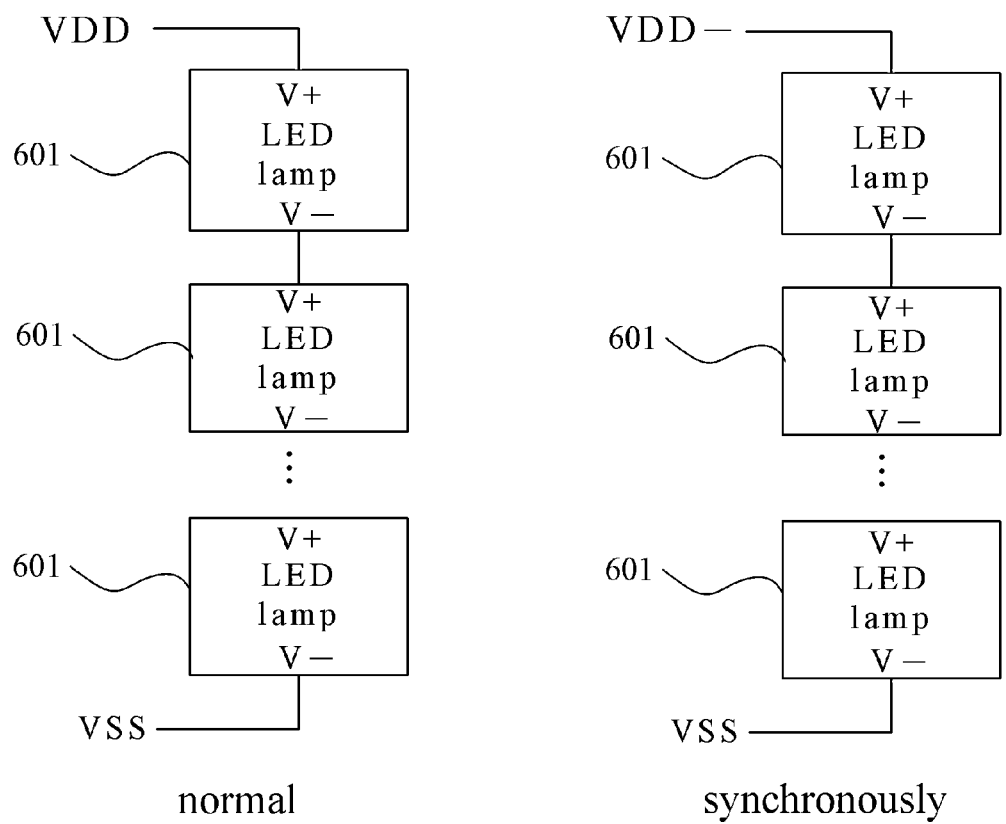
FIG. 6 is a schematic view showing a synchronization circuit for synchronizing the integrated LED lamps according to a preferred embodiment of the present invention.

In the embodiment of the present invention, in order to prevent the condition of FIG. 5 from occurring, the LEDs need to be synchronized every period of time. FIG. 6 is a schematic view showing a synchronization circuit for synchronizing the integrated LED lamps according to a preferred embodiment of the present invention. As shown in FIGS. 3 and 6, in order to make those skilled in the art understand the present invention, FIG. 6 further depicts multiple integrated LED lamps 601 of FIG. 3. In the normal operation, the bias voltage between two ends of each of the integrated LED strings is the normal VDD and VSS. When the synchronization operation is performed, the bias voltage between two ends of the string of the integrated LED lamps 601 is the lower VD− and the normal VSS. Furthermore, the synchronization starting circuit 324 is coupled to the first power pin and the second power pin of the integrated LED lamp. Thus, when the bias voltage between the two ends of the integrated LED lamp string is the lower VDD− and the normal VSS, the voltages V+ and V− are decreased, and the synchronization starting circuit 324 of the integrated LED lamp starts the synchronization mechanism to reset the counter 326. Thus, each integrated LED lamp returns to the original display order.

Figure 7:
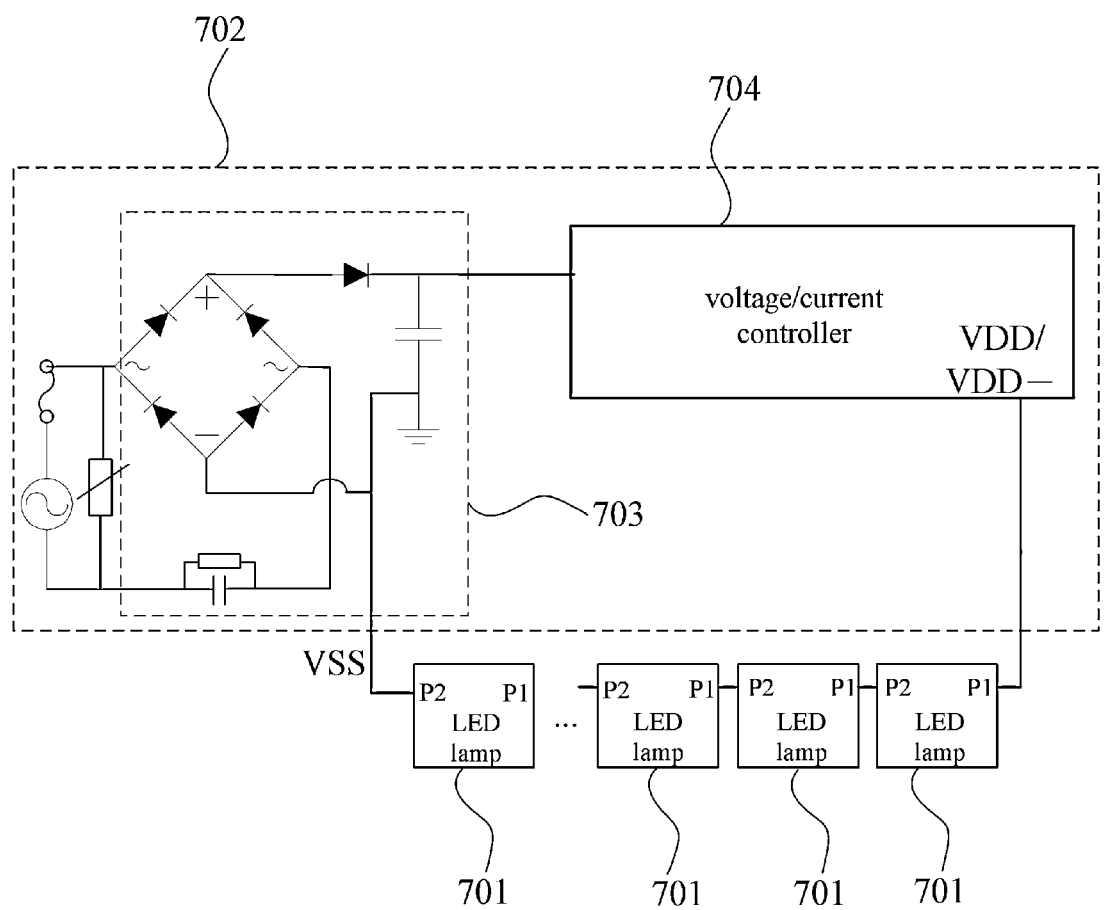
FIG. 7 is a circuit diagram showing the synchronization circuit and an integrated LED lamp string according to a preferred embodiment of the present invention.

FIG. 7 is a circuit diagram showing the synchronization circuit and an integrated LED lamp string according to a preferred embodiment of the present invention. Referring to FIG. 7, the integrated LED lamp string includes multiple integrated LED lamps 701. The synchronization circuit 702 includes a power supply 703 and a voltage/current controller 704. The output terminal of the voltage/current controller 704 is coupled to the first power pin P1 of the first integrated LED lamp, the first power pin P1 of the second integrated LED lamp is coupled to the second power pin P2 of the first integrated LED lamp, and so on. Furthermore, in order to make the synchronization not be sensed by the human's eye, the display timing inside the ROM 327 or the contents of the ROM 327 may be stored in the voltage/current controller 704.

In the normal mode, the voltage/current controller 704 outputs the normal voltage/current, so that the voltage difference between or the current of the first power pin P1 and the second power pin P2 of each integrated LED lamp is kept constant. In the synchronous mode, the voltage/current controller 704 decreases the voltage/current supplied to the integrated LED lamps 701. At this time, the synchronization starting circuit 324 in each integrated LED lamp 701 detects the decrease of the voltage difference between the first power pin P1 and the second power pin P2, and thus triggers the synchronous mode. The synchronization starting circuit 324 of each integrated LED lamp 701 starts the synchronization mechanism to output a synchronization starting signal. The counter 326 resets the counter 326 upon receiving of the synchronization starting signal. Thus, each integrated LED lamp 701 recovers to the original display order.

Figure 8:
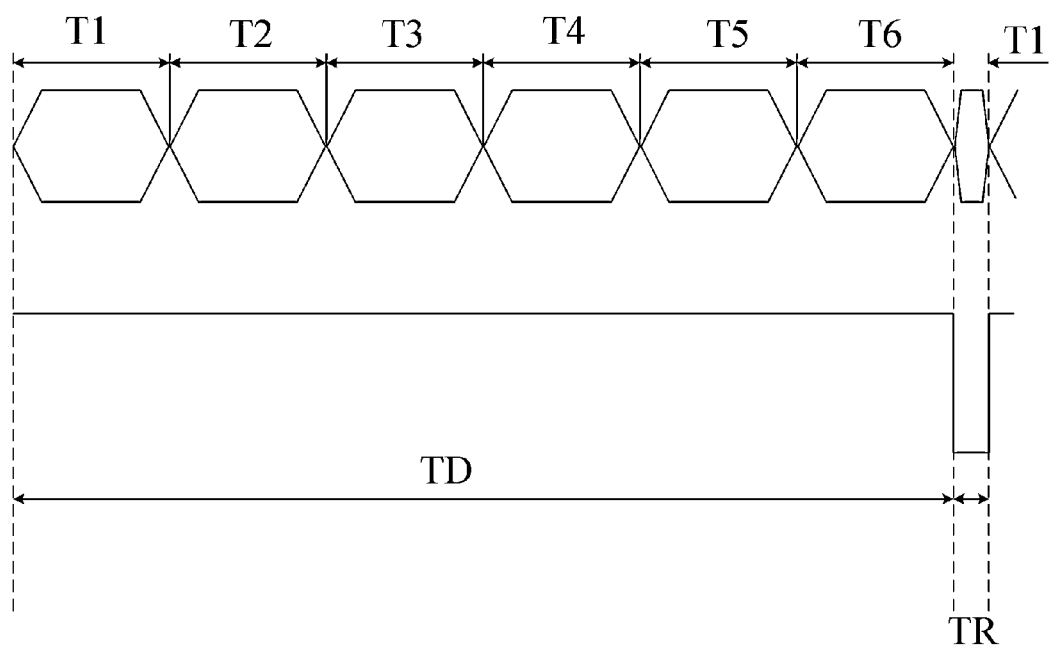
FIG. 8 is a schematic view showing synchronization cycles of an integrated LED lamp string according to a preferred embodiment of the present invention.

According to the above-mentioned embodiment, it is obtained that the problem of the display defect can be avoided as long as the synchronization is performed before the display defect occurs. However, in order to prevent the human's eye from feeling that the synchronization is being performed, the synchronization time may be controlled to fall within the range after the sixth time T6 of FIG. 4 ends and before the first time T1 starts. FIG. 8 is a schematic view showing synchronization cycles of an integrated LED lamp string according to a preferred embodiment of the present invention. As shown in the example of FIG. 8, a reset cycle TR is provided between each display cycle TD and the next display cycle TD. In the reset cycle TR, the voltage/current controller 704 controls the bias voltage supplied to multiple integrated LED lamps 701, so that the integrated LED lamps 701 perform the counter reset concurrently.

Figure 9:
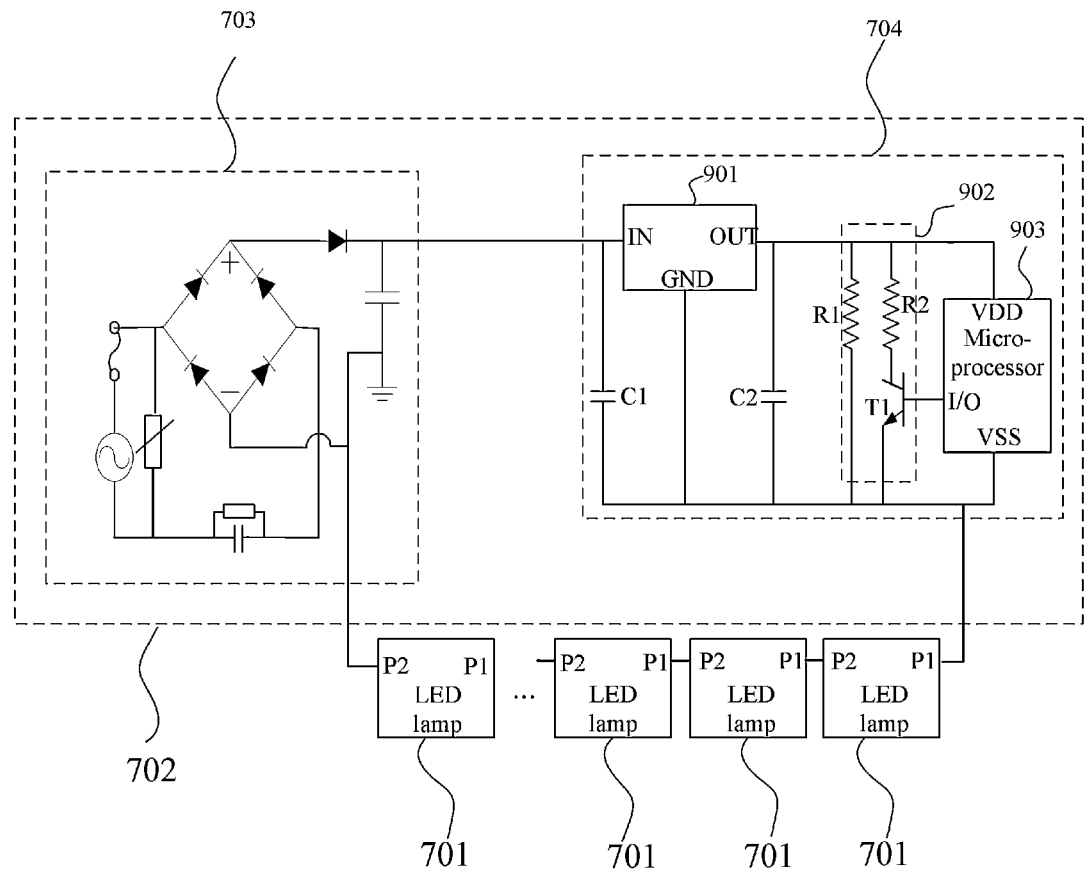
FIG. 9 is a detailed circuit diagram showing a synchronization circuit according to a preferred embodiment of the present invention.

FIG. 9 is a detailed circuit diagram showing a synchronization circuit according to a preferred embodiment of the present invention. Referring to FIG. 9, the voltage/current controller 704 in this embodiment includes a power regulator 901, an impedance adjusting circuit 902 and a microprocessor 903. The power regulator 901 is implemented by a voltage regulator LM7805 and capacitors C1 and C2, which are frequently seen, for example. The impedance adjusting circuit 902 is implemented by a first resistor R1, a second resistor R2 and a transistor switch T1. In addition, this embodiment assumes that the microprocessor 903 stores the display timing in the ROM 327 or stores the contents of the ROM 327. In addition, in order to make those skilled in the art understand the present invention, multiple integrated LED lamps 701 are additionally depicted in this circuit diagram.

The power regulator 901 controls the voltage between the VSS pin and the VDD pin of the microprocessor 903 to be 5 V. In the normal operation, the microprocessor 903 controls the transistor switch T1 to turn on. At this time, the current flowing through the integrated LED lamps 701 is assumed to be I. When the synchronous mode is entered, the microprocessor 903 controls the transistor switch T1 to turn off. At this time, the current flowing the integrated LED lamp 701 is assumed to be I−. Because I>I−, the synchronization starting circuit 324 of each integrated LED lamp 701 detects the voltage drop between the first power pin and the second power pin of each integrated LED lamp 701, and the synchronization starting circuit 324 resets the counter 326. Thus, each integrated LED lamp recovers to the original display order.

In the above-mentioned embodiment, red, green and blue LEDs are integrated as an example. However, those skilled in the art should understand that the integration of the LEDs with the red, yellow, blue or the color light of 6000 K and 2800 K may also achieve the above-mentioned effect. The present invention should not be restricted thereto. Furthermore, although the impedance adjusting circuit 902 of the above-mentioned embodiment is implemented by the transistor T1 and the resistors R1 and R2, those skilled in the art should understand that the adjustable current source or voltage source may also serve as the impedance adjusting circuit. So, the present invention should not be restricted thereto.

Figure 10:
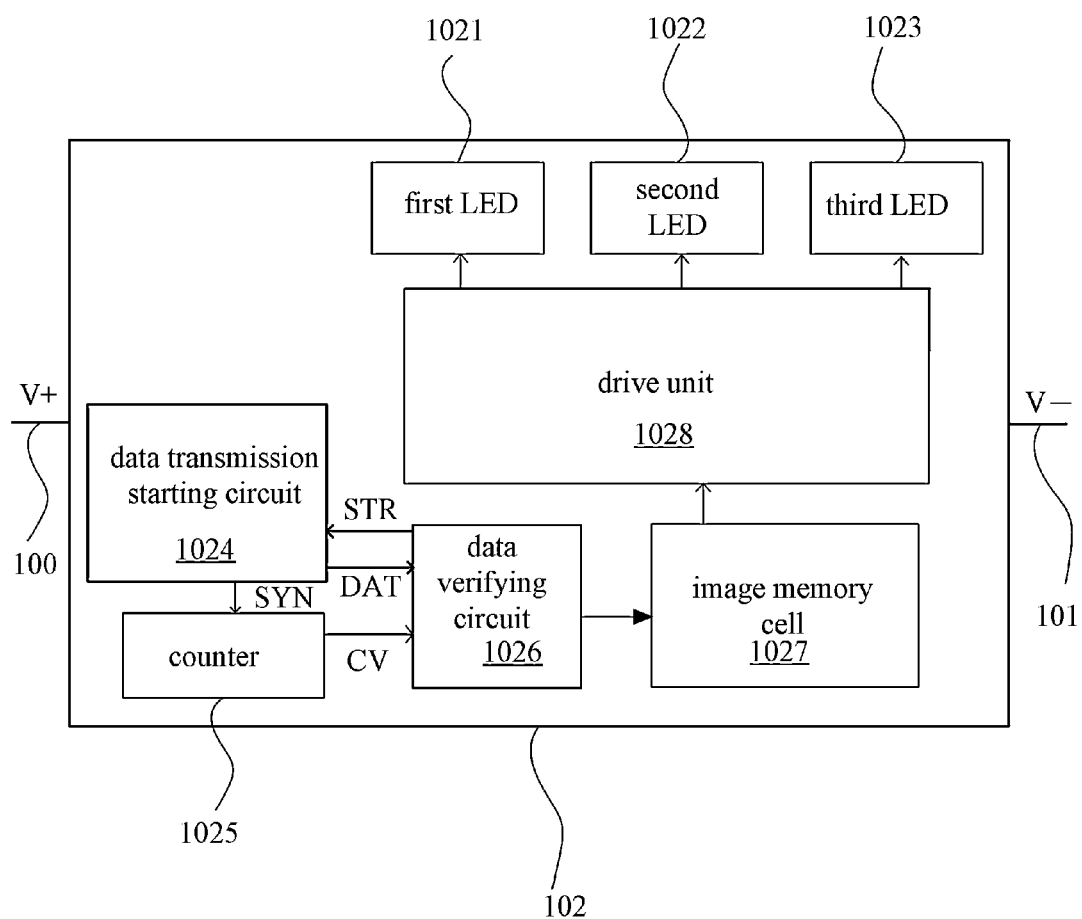
FIG. 10 is a circuit block diagram showing an integrated LED according to a preferred embodiment of the present invention.

FIG. 10 is a circuit block diagram showing an integrated LED according to a preferred embodiment of the present invention. Referring to FIG. 10, the integrated LED lamp in this embodiment similarly includes a first power pin 100, a second power pin 101 and a LED package 102. The LED package 102 includes a first LED 1021, a second LED 1022, a third LED 1023, a data transmission starting circuit 1024, a counter 1025, a data verifying circuit 1026, an image memory cell 1027 and a drive circuit 1028. In this example embodiment, the first LED 1021, the second LED 1022 and the third LED 1023 are red, green and blue LEDs. Similarly, the image memory cell 1027 records the lighting/extinguishing order or the lighting brightness of the first LED 1021, the second LED 1022 and the third LED 1023.

In this embodiment, the image memory cell 1027 is implemented using a shift register instead of the ROM. In addition, because the image memory cell 1027 is not implemented using the ROM, the display pattern data of the LED only can be temporarily stored. Thus, before the lighting is performed, the data must be provided from the outside to the image memory cell 1027. In this embodiment, the display pattern data is transmitted to the image memory cell 1027 through the voltage and/or current changes of the first power pin 100 and the second power pin 101.

Figure 11:
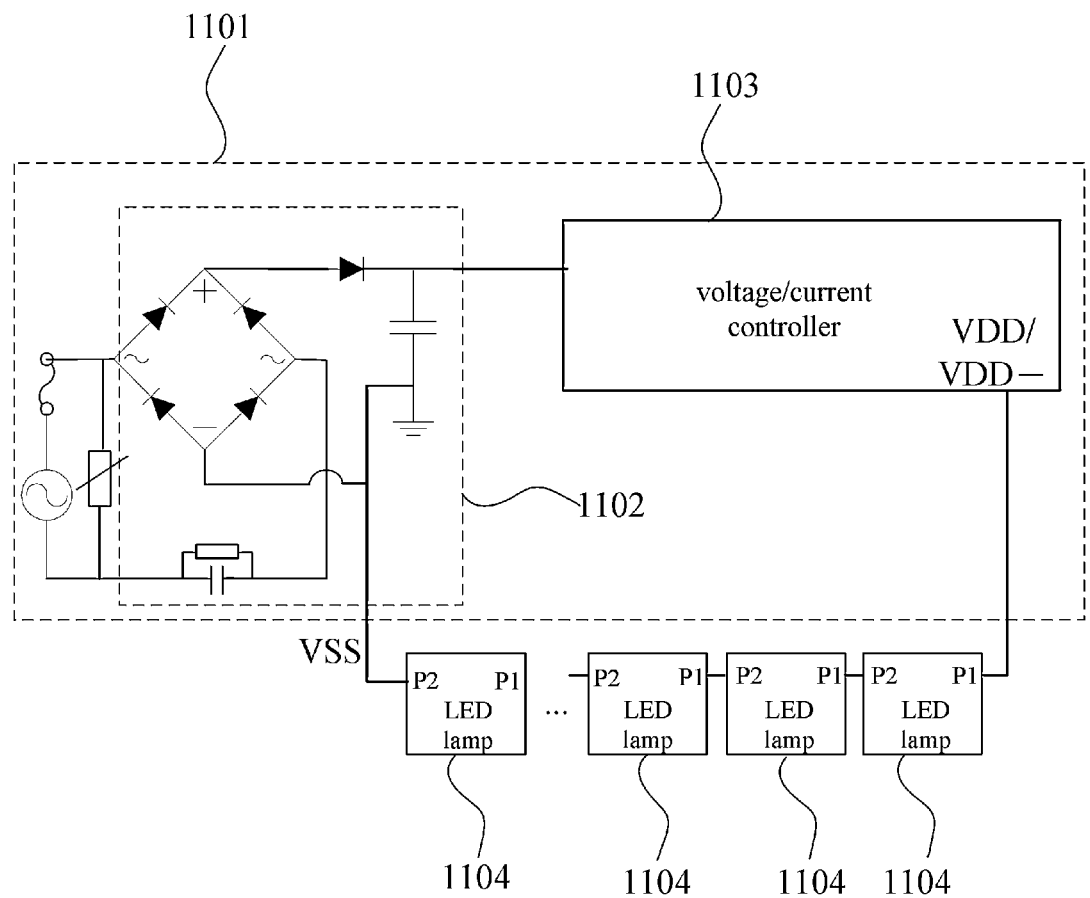
FIG. 11 is a circuit diagram showing a data transmission circuit according to a preferred embodiment of the present invention.

In order to make those skilled in the art understand the present invention, this embodiment provides an implemented method of the data transmission circuit. Please refer to FIGS. 11 and 10, a data transmission circuit 1101 includes a power supply 1102 and a voltage/current controller 1103. In addition, in order to make those skilled in the art understand the present invention, multiple integrated LED lamps 1104 are additionally depicted in this circuit diagram. In FIG. 11, each integrated LED lamp 1104 has the circuit structure of the integrated LED lamp of FIG. 10.

Before the display starts, the display pattern data must be firstly transmitted to each integrated LED lamp 1104, wherein the data verifying circuit 1026 in each integrated LED lamp 1104 has stored a lamp number. Because each integrated LED lamp 1104 only can determine whether the received data/signal is the pattern data, the sync signal, or the signal of the normal operation according to the voltage/current change between the first power pin 100 and the second power pin 101, the voltage/current controller 1103 outputs at least three bias voltages/currents. For the sake of easy description, the bias voltage of transmission start voltage is assumed to be V1; the first logic voltage of transmission of the first logic is assumed to be V2; and the bias voltage of the normal operation and the second logic voltage are assumed to be V3.

Figure 12:
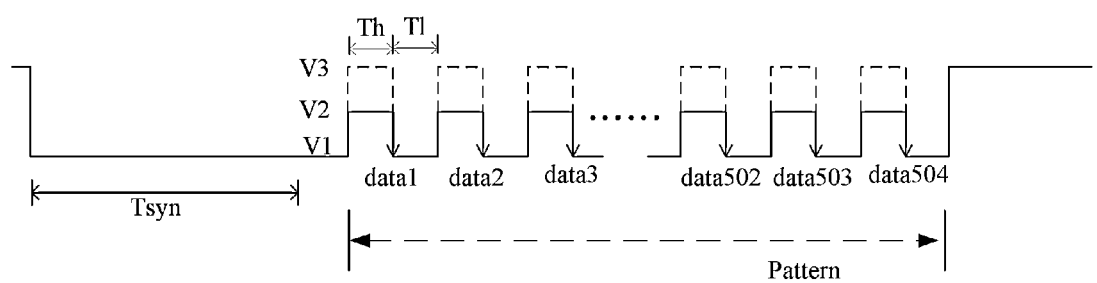
FIG. 12 is an operation waveform diagram showing a data transmission circuit according to a preferred embodiment of the present invention.

FIG. 12 is an operation waveform diagram showing a data transmission circuit according to a preferred embodiment of the present invention. Referring to FIG. 12, when the transmission starts, the voltage/current controller 1103 firstly controls the bias voltage to make the voltage between the first power pin 100 and the second power pin 101 of each integrated LED lamp 1104 approximate the transmission start voltage V1 for a synchronization time Tsyn. When the data transmission starting circuit 1024 of each integrated LED lamp 1104 detects that the voltage between the first power pin 100 and the second power pin 101 is equal to the transmission start voltage V1 for the synchronization time Tsyn, the data transmission starting circuit 1024 will output a data transmission enable signal SYN and start to prepare to receive the display pattern data. At this time, the voltage/current controller 1103 starts to change the output bias voltage according to the logic of the display pattern data. When the display pattern data is the first logic, the voltage between the first power pin 100 and the second power pin 101 of each integrated LED lamp 1104 is V2. When the display pattern data is the second logic, the voltage between the first power pin 100 and the second power pin 101 of each integrated LED lamp 1104 is V3. Furthermore, the transmission start voltage V1 is inserted between the bit logic to serve as the reference for the clock.

Meanwhile, the data transmission starting circuit 1024 of each integrated LED lamp 1104 detects the change of the voltage between the first power pin 100 and the second power pin 101, and judges the logic of the received display pattern data. The data verifying circuit 1026 stores with numbers (e.g., the data verifying circuit 1026 of the first integrated LED lamp stores with the number 1, and the data verifying circuit 1026 of the third integrated LED lamp stores with the number 3). In order to make those skilled in the art understand how each integrated LED lamp 1104 of the present invention receives data, five integrated LED lamps will be described as an example, and the bit number required by each integrated LED lamp 1104 is equal to 24 bits (8 bits for each of red R, green G, blue B).

After the synchronization of the fifth integrated LED lamp 1104 is completed, the data transmission starting circuit 1024 of the fifth integrated LED lamp 1104 notifies the internal counter 1025 to start to count. The counting frequency of the counter 1025 and the timing of the voltage/current controller 1103 of transmitting the logic data are substantially the same. So, when the voltage/current controller 1103 transmits the first bit, the count value CV outputted from the counter 1025 is equal to 1; and when the voltage/current controller 1103 transmits the third bit, the count value CV outputted from the counter 1025 is equal to 3. When the count value CV outputted from the counter 1025 of the fifth integrated LED lamp 1104 is equal to 97 (24×4+1), the data verifying circuit 1026 outputs a receiving start signal STR, and the data transmission starting circuit 1024 transmits the 97$^{th}$ bit data and its subsequent data DAT to the data verifying circuit 1026. The data verifying circuit 1026 sequentially transmits the data DAT to the shift register 1027, which sequentially stores the data. When the count value CV outputted from the counter 1025 of the fifth integrated LED lamp 1104 is equal to 120 (24×5), the data verifying circuit 1026 stops receiving the data. At this time, the shift register 1027 of the fifth integrated LED lamp 1104 stores the 97$^{th}$ to 120$^{th}$ bits of display data, which is transmitted by the voltage/current controller 1103.

After the transmission of all the data is finished, the voltage/current controller 1103 outputs a normal bias voltage, so that the voltage between the first power pin 100 and the second power pin 101 of each integrated LED lamp 1104 returns to V3. Thus, each integrated LED lamp 1104 starts the normal operation.

In the normal operation, the counter 1025 and the data verifying circuit 1026 stop operating, and the shift register 1027 and the drive circuit 1028 start to operate. The shift register 1027 outputs the display pattern corresponding to the first LED 1021, the second LED 1022 and the third LED 1023. The drive circuit 1028 drives the first LED 1021, the second LED 1022 and the third LED 1023 according to the received display pattern.

Figure 13:
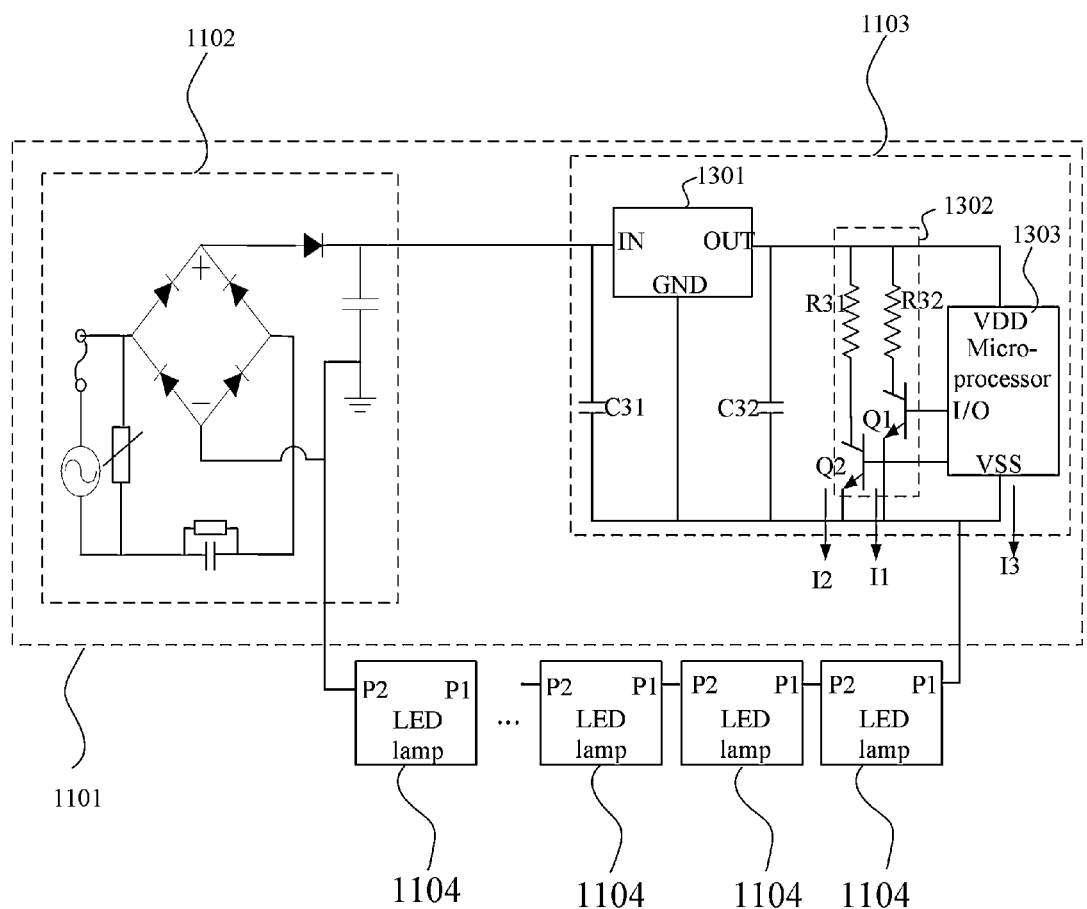
FIG. 13 is a detailed circuit diagram showing a data transmission circuit according to a preferred embodiment of the present invention.

FIG. 13 is a detailed circuit diagram showing a data transmission circuit according to a preferred embodiment of the present invention. Referring to FIG. 13, the voltage/current controller 1103 in this embodiment includes a power regulator 1301, an impedance adjusting circuit 1302 and a microprocessor 1303. The power regulator 1301 is implemented by a voltage regulator LM7805 and capacitors C31 and C32, which are frequently seen. The impedance adjusting circuit 1302 is implemented by a first resistor R31, a second resistor R32, a first transistor switch Q1 and a second transistor switch Q2.

Referring to FIGS. 12 and 13, when a general operation is performed, the voltage is set at V3. At this time, the microprocessor 1303 controls the first transistor switch Q1 and second transistor switch Q2 to turn on. Thus, the integrated LED lamp 1104 can receive the current I1 flowing through the first transistor switch Q1, the current I2 flowing through the second transistor switch Q2 and the current I3 flowing through the microprocessor 1303 concurrently. When the data transmission is ready to perform the synchronization, the microprocessor 1303 controls the first transistor switch Q1 and the second transistor switch Q2 to turn off concurrently. Thus, the integrated LED lamp 1104 only can receive the current I3 flowing through the microprocessor 1303. The voltage between two terminals of each integrated LED lamp 1104 drops, and the internal data transmission starting circuit 1024 starts to judge whether the synchronization is present. When the voltage between the first power pin 100 and the second power pin 101 is detected to be equal to the transmission start voltage V1 for the synchronization time Tsyn, the data receiving starts.

Also, after the synchronization is completed, the voltage V2 represents the first logic, and the voltage V3 represents the second logic. When the first logic is outputted, the microprocessor 1303 controls the first transistor switch Q1 to turn off, and controls the second transistor switch Q2 to turn on. Thus, the integrated LED lamp 1104 receives the current I3 flowing through the microprocessor 1303 and the current I2 flowing through the second transistor switch Q2. The data transmission starting circuit 1024 of each integrated LED lamp 1104 judges the voltage as the first logic or the second logic to judge the received data. Because the data transmitting and receiving methods have been described in the above-mentioned embodiment, detailed descriptions thereof will be omitted.

Figure 14:
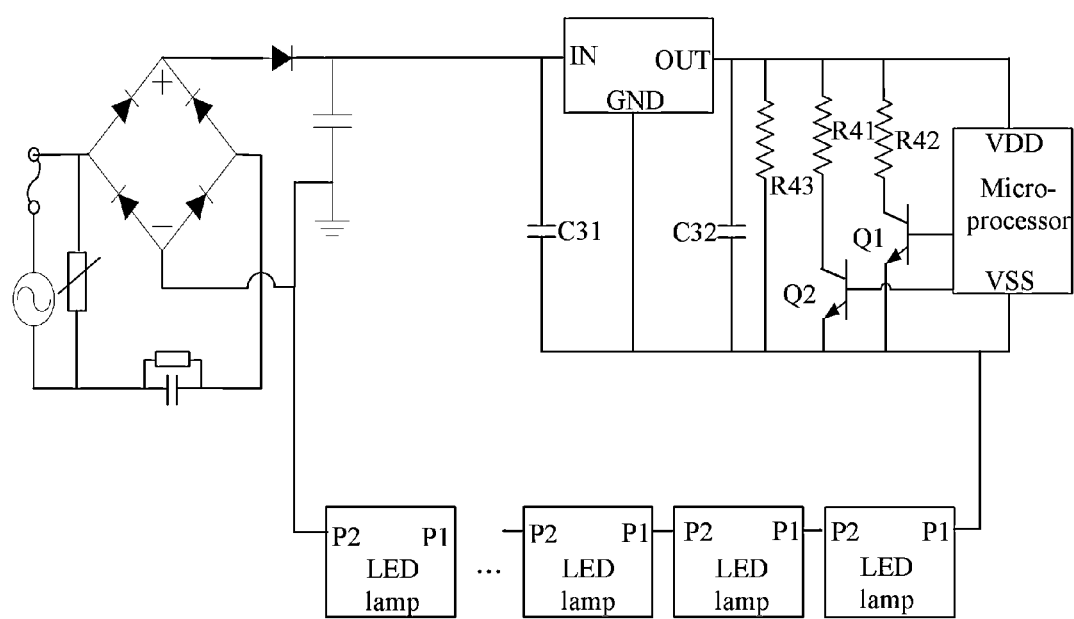
FIG. 14 is a detailed circuit diagram showing a data transmission circuit according to a preferred embodiment of the present invention.
Figure 15:
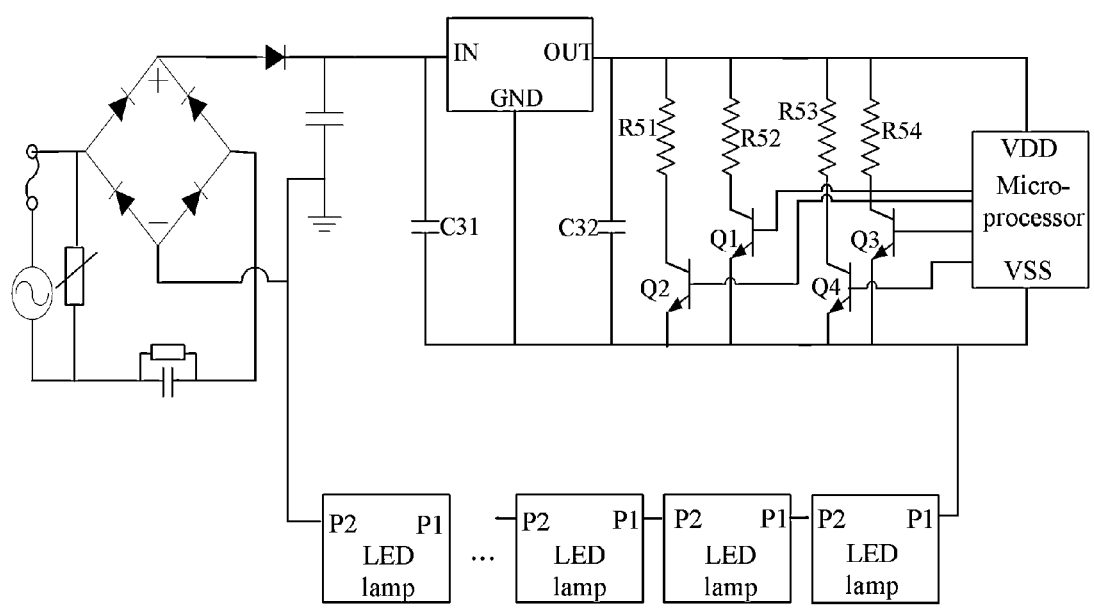
FIG. 15 is a detailed circuit diagram showing a data transmission circuit according to a preferred embodiment of the present invention.

In the above-mentioned embodiment, red, green and blue LEDs are integrated as an example. However, those skilled in the art should understand that the integration of the LEDs with the red, yellow, blue or the color light of 6000 K and 2800 K may also achieve the above-mentioned effect. The present invention should not be restricted thereto. Furthermore, although the impedance adjusting circuit 1302 of the above-mentioned embodiment is implemented by the transistors Q1, Q2 and the resistors R31, R32, those skilled in the art should understand that the adjustable current source or voltage source may also serve as the impedance adjusting circuit. So, the present invention should not be restricted thereto. In addition, although the above-mentioned embodiment is implemented by two transistors Q1, Q2 and two resistors, those skilled in the art should understand that the numbers of the transistors and the resistors may also be modified. FIG. 14 is a detailed circuit diagram showing a data transmission circuit according to a preferred embodiment of the present invention. As shown in FIG. 14, three resistors R41, R42 and R43 and two transistors Q1 and Q2 may also be implemented as the embodiment of the impedance adjusting circuit 1302. FIG. 15 is a detailed circuit diagram showing a data transmission circuit according to a preferred embodiment of the present invention. As shown in FIG. 15, four resistors R51, R52, R53 and R54 and four transistors Q1, Q2, Q3 and Q4 may also be implemented as the embodiment of the impedance adjusting circuit 1302. So, the present invention should not be restricted thereto.

Furthermore, the data receiving method of each LED lamp in the embodiment is to use the counter 1025 to calculate the corresponding bits according to the numbers stored in the data verifying circuit 1026, so that the data transmission starting circuit 1024 receives the corresponding bit. However, those skilled in the art should understand that the data transmission method may also package the data into a packet or packets, so that the data transmission starting circuit 1024 acquires the corresponding data according to the header of the packet. This case does not need the data verifying circuit 1026 and the counter 1025. In other words, the data verifying circuit 1026 and the counter 1025 are not essential circuits. Any method for transmitting data by changing the voltage between the first power pin and the second power pin falls within the spirit of the present invention and will not be described herein.

In abovementioned embodiments, to achieve the data transmission, at least three different voltages/currents are required. In the following embodiment, only two different voltages/currents are required to achieve the data transmission.

Figure 16:
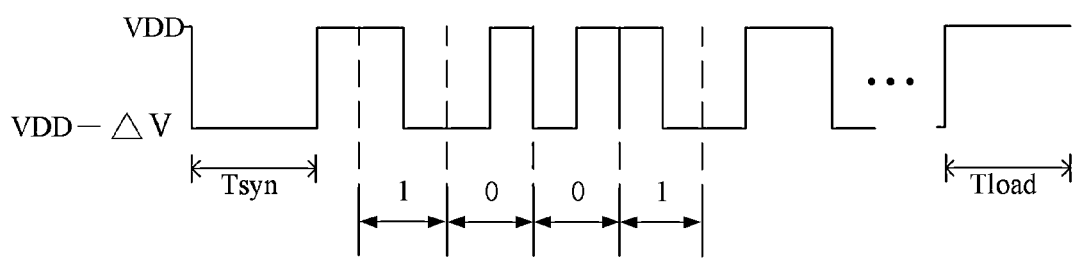
FIG. 16 is an operation waveform diagram showing a data transmission circuit according to a preferred embodiment of the present invention.

FIG. 16 is an operation waveform diagram showing a data transmission circuit according to a preferred embodiment of the present invention. Referring to FIG. 16 and FIG. 9, since only two different voltages/currents (VDD and VDD−ΔV) are required to achieve the data transmission, the synchronization circuit in FIG. 9 can be adopted to operate the integrated LED such that the data transmission can be achieved. Further, in order to conform to the abovementioned data transmission, the hardware of the integrated LED might be slightly modified.

Figure 17:
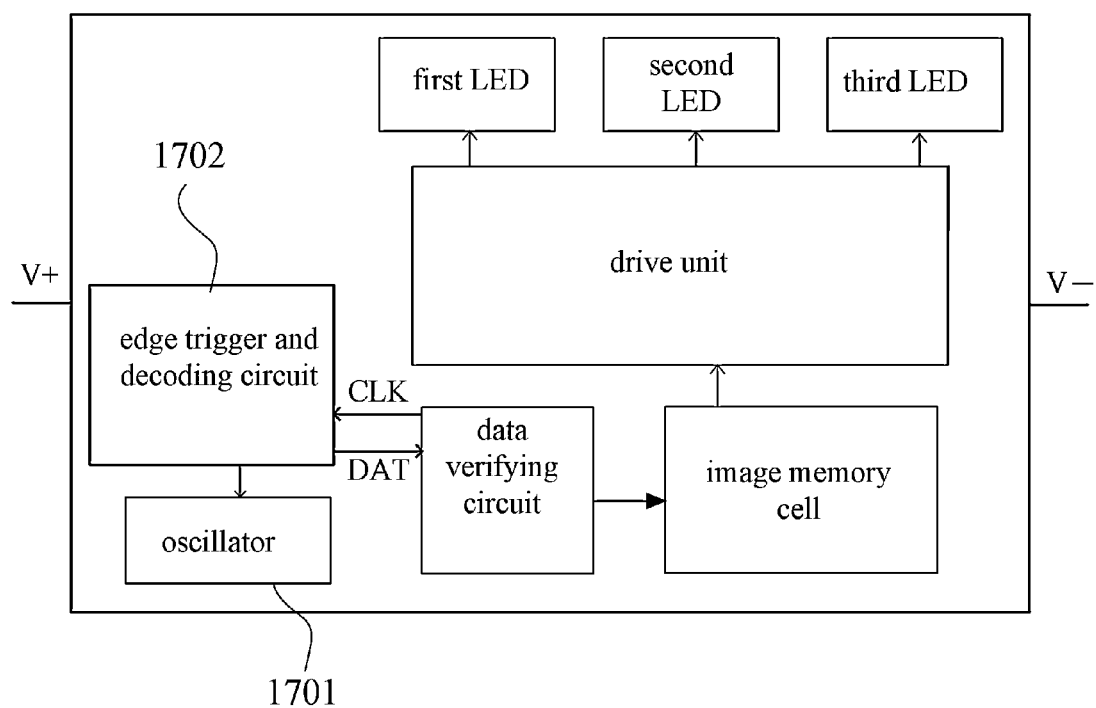
FIG. 17 is a circuit block diagram showing an integrated LED according to a preferred embodiment of the present invention.

FIG. 17 is a circuit block diagram showing an integrated LED according to a preferred embodiment of the present invention. Referring to FIG. 10 and FIG. 17, in this embodiment, the data transmission starting circuit is implemented by an oscillator 1701 and a edge trigger and decoding circuit 1702. Three voltages detection is not necessary in this embodiment, only two voltages and its positive or negative edge need to be detected. Thus, the data transmission starting circuit is changed to the edge trigger and decoding circuit 1702.

When the transmission starts, the voltage/current controller 704 firstly controls the bias voltage to make the voltage between the first power pin P1 and the second power pin P2 of each integrated LED lamp 701 approximate the transmission start voltage VDD−ΔV for a synchronization time Tsyn. When the edge trigger and decoding circuit 1702 of each integrated LED lamp 701 detects that the voltage between the first power pin P1 and the second power pin P2 is equal to the transmission start voltage VDD−ΔV for the synchronization time Tsyn, the edge trigger and decoding circuit 1702 will output a data transmission enable signal SYN and start to prepare to receive the display pattern data. At this time, the voltage/current controller 704 starts to change the output bias voltage (VDD and VDD−ΔV) according to the logic of the display pattern data. When the display pattern data is the first logic, the voltage/current controller 704 outputs the normal operation voltage VDD in the first half period of the clock period, and then the voltage/current controller 704 outputs the transmission start voltage VDD−ΔV in the second half period of the clock period. When the display pattern data is the second logic, the voltage/current controller 704 outputs the transmission start voltage VDD−ΔV in the first half period of the clock period, and then the voltage/current controller 704 outputs the normal operation voltage VDD in the second half period of the clock period.

After the transmission of all the data is finished, the voltage/current controller 704 outputs a normal bias voltage VDD for a period Tload, so that the voltage between the first power pin P1 and the second power pin P2 of each integrated LED lamp 701 returns to the normal operation voltage. Thus, each integrated LED lamp 701 starts the normal operation.

According to the abovementioned embodiment, the voltage/current controller 704 only needs to provide two biases to the integrated LED 701 such that the normal operation and the data transmission can be achieved. Thus, the data transmission circuit in this embodiment can adopt the synchronization circuit in FIG. 9. Comparing with the circuit in FIG. 11, the present embodiment can save more elements.

In summary, the spirit of the present invention resides in that the integrated LED lamp only needs to use two pins to synchronize the LEDs and to further update a displayed pattern. Thus, the integration of multiple colors of LEDs can use the original two-pin package without modifying the package form. The present invention can reduce the wires and decrease the manufacturing cost. In addition, because the old package technology has been well grown, the risk of the yield reduction caused by the new package technology can be avoided.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An integrated LED lamp, comprising:
    a first power pin coupled to a first power voltage;
    a second power pin coupled to a second power voltage;
    a LED package, comprising:
    a first LED for outputting first color light;
    a second LED for outputting second color light;
    a synchronization starting circuit coupled to the first power pin and the second power pin;
    an oscillator for providing a clock signal;
    a counter, which is coupled to the oscillator and the synchronization starting circuit and for counting according to the clock signal to generate an address signal;
    an image memory cell, which is coupled to the counter, receives the address signal, and provides image data corresponding to the address signal according to the address signal; and
    a drive circuit comprising an input port and an output port, wherein the input port of the drive circuit is coupled to the image memory cell and receives the image data, wherein the drive circuit controls an order of lighting the first LED and the second LED according to the image data, wherein
    the synchronization starting circuit detects voltages/currents of the first power pin and the second power pin,
    when a difference between the voltages/currents of the first power pin and the second power pin reaches a threshold, the synchronization starting circuit outputs a synchronization starting signal, and
    the counter resets upon receiving of the synchronization starting signal.

2. The integrated LED lamp according to claim 1, further comprising a third LED for outputting a third color light,
    wherein the drive circuit controls an order of lighting the first LED, the second LED and the third LED according to the image data.

3. The integrated LED lamp according to claim 1, wherein the image memory cell is a read only memory.

4. A synchronization circuit for driving N integrated LED lamps, each of which comprising:
    a first power pin coupled to a first power voltage;
    a second power pin coupled to a second power voltage;
    a LED package, comprising:
    a first LED for outputting first color light;
    a second LED for outputting second color light;
    a synchronization starting circuit coupled to the first power pin and the second power pin;
    an oscillator for providing a clock signal;
    a counter, which is coupled to the oscillator and the synchronization starting circuit and for counting according to the clock signal to generate an address signal;
    an image memory cell, which is coupled to the counter, receives the address signal, and provides image data corresponding to the address signal according to the address signal;
    a drive circuit comprising an input port and an output port, wherein the input port of the drive circuit is coupled to the image memory cell and receives the image data, wherein the drive circuit controls an order of lighting the first LED and the second LED according to the image data,
    wherein the synchronization starting circuit detects voltages/currents of the first power pin and the second power pin,
    wherein the first power pin of the $(I+1)^{th}$ integrated LED lamp is coupled to the second power pin of the $I^{th}$ integrated LED lamp,
    wherein the synchronization circuit comprises:
    a power supply circuit comprising an output terminal; and
    a voltage/current controller comprising an input terminal and an output terminal, wherein the input terminal of the voltage/current controller is coupled to the output terminal of the power supply circuit, the output terminal of the voltage/current controller is coupled to the first power pin of the first integrated LED lamp, wherein the voltage/current controller selectively outputs a first voltage/current and a second voltage/current to the N integrated LED lamps,
    wherein in a normal mode, the voltage/current controller outputs the first voltage/current to drive the N integrated LED lamps,
    wherein in a synchronous mode, the voltage/current controller outputs the second voltage/current to drive the N integrated LED lamps,
    wherein when voltages/currents of the first power pin and the second power pin of the at least one specific integrated LED lamp reach the second voltage/current, the synchronization starting circuit of the specific integrated LED lamp outputs a synchronization starting signal,
    when the counter of the specific integrated LED lamp receives the synchronization starting signal, the counter resets,
    the voltage/current controller enters the synchronous mode every predetermined time,
    wherein N and I are natural numbers, and $0<I<=N$.

5. The synchronization circuit according to claim 4, wherein each of the integrated LED lamps further comprises a third LED for outputting third color light, wherein the drive circuit of each of the integrated LED lamps controls an order of lighting the first LED, the second LED and the third LED in the integrated LED lamp according to the image data.

6. The synchronization circuit according to claim 4, wherein the voltage/current controller comprises:

a power regulator comprising an input terminal, a common-voltage terminal and an output terminal, wherein the input terminal of the power regulator is coupled to the output terminal of the power supply circuit, and the power regulator regulates a voltage of the output terminal to the common-voltage terminal into a power voltage;

a microprocessor comprising a power voltage terminal, a common-voltage terminal and an input-output terminal, wherein the power voltage terminal of the microprocessor is coupled to the output terminal of the power regulator, the common-voltage terminal of the microprocessor is coupled to the common-voltage terminal of the power regulator and the first power pin of the first integrated LED lamp;

an impedance adjusting circuit comprising a first terminal, a second terminal and a control terminal, wherein the control terminal of the impedance adjusting circuit is coupled to the input-output terminal of the microprocessor, the first terminal of the impedance adjusting circuit is coupled to the output terminal of the power regulator, and the second terminal of the impedance adjusting circuit is coupled to the first power pin of the first integrated LED lamp, wherein the microprocessor enters the synchronous mode every the predetermined time, wherein in the synchronous mode, the microprocessor outputs a control signal, the impedance adjusting circuit adjusts an impedance between the first terminal and the second terminal of the impedance adjusting circuit according to the control signal to change a voltage/current between the first power pin and the second power pin of each of the integrated LED lamps, so that each of the integrated LED lamps resets the counter therein to perform synchronization.

7. The synchronization circuit according to claim 6, wherein the impedance adjusting circuit comprises:

a first resistor comprising a first terminal and a second terminal, wherein the first terminal of the first resistor is coupled to the output terminal of the power regulator, and the second terminal of the first resistor is coupled to the first power pin of the first integrated LED lamp;

a second resistor comprising a first terminal and a second terminal, wherein the first terminal of the second resistor is coupled to the output terminal of the power regulator; and a first switch comprising a first terminal, a second terminal and a control terminal, wherein the first terminal of the first switch is coupled to the second terminal of the second resistor, the second terminal of the first switch is coupled to the first power pin of the first integrated LED lamp, and the control terminal of the first switch is coupled to the input-output terminal of the microprocessor.

8. A data transmission circuit for driving N integrated LED lamps, wherein each of the integrated LED lamps comprises:

a first power pin coupled to a first power voltage;

a second power pin coupled to a second power voltage;

a LED package, comprising:

a first LED for outputting first color light;

a second LED for outputting second color light;

a data transmission starting circuit coupled to the first power pin and the second power pin, wherein the data transmission starting circuit detects voltages/currents of the first power pin and the second power pin;

an image memory cell providing image data;

a drive circuit comprising an input port and an output port, wherein the input port of the drive circuit is coupled to the image memory cell and receives the image data, wherein the drive circuit controls an order of lighting the first LED and the second LED according to the image data, wherein the first power pin of the $(I+1)^{th}$ integrated LED lamp is coupled to the second power pin of the $I^{th}$ integrated LED lamp, wherein the data transmission circuit comprises:

a power supply circuit comprising an output terminal; and a voltage/current controller comprising an input terminal and an output terminal, wherein the input terminal of the voltage/current controller is coupled to the output terminal of the power supply circuit, and the output terminal of the voltage/current controller is coupled to the first power pin of the first integrated LED lamp, wherein the voltage/current controller selectively outputs a first voltage/current, a second voltage/current, a third voltage/current and a fourth voltage/current to the N integrated LED lamps, wherein in a normal mode, the voltage/current controller outputs the first voltage/current to drive the N integrated LED lamps, wherein in a data receiving mode, the voltage/current controller continuously outputs the second voltage/current in a first period to notify the data transmission starting circuits of the N integrated LED lamps to enter the data receiving mode, and then when to-be-transmitted bit data is first logic, the voltage/current controller outputs the third voltage/current, when the transmitted bit data is second logic, the voltage/current controller outputs the fourth voltage/current, wherein the voltage/current controller outputs the second voltage between the bit data, wherein N and I are natural numbers, and $0 < I <= N$.

9. The data transmission circuit according to claim 8, wherein each of the integrated LED lamps further comprises:

a counter for performing counting to provide a count signal;

a data verifying circuit coupled to the counter and the data transmission starting circuit, wherein the data verifying circuit stores a lamp number, and the lamp number stored in the data verifying circuit of the $I^{th}$ integrated LED lamp is I;

wherein the image memory cell is coupled to the counter and the data transmission starting circuit;

wherein when a difference between the voltages/currents of the first power pin and the second power pin of the at least one specific integrated LED lamp reaches a threshold for the first period, the data transmission starting circuit of the specific integrated LED lamp outputs a data transmission enable signal, wherein when the counter of the specific integrated LED lamp receives the data transmission enable signal, the counter counts, wherein when the difference between the voltages/currents of the first power pin and the second power pin of the $I^{th}$ integrated LED lamp reaches the threshold for the first period, the counter of the $I^{th}$ integrated LED lamp counts, when the counter of the $I^{th}$ integrated LED lamp counts to $(K\times(I-1)+1)$, bits received by the data transmission starting circuit of the $I^{th}$ integrated LED lamp are $(K\times(I-1)+1)$ bits, the data verifying circuit of the $I^{th}$ integrated LED lamp notifies the data transmission starting circuit of $I^{th}$ integrated LED lamp, to transmit logic data from the received $(K\times(I-1)+1)$ bits to $(K\times I)$ bits to the image memory cell of the $I^{th}$ integrated LED lamp to update pattern data of the image memory cell of the $I^{th}$ integrated LED lamp, wherein K is a total bit number of display data for each of the integrated LED lamps, and wherein K is a natural number.

10. The data transmission circuit according to claim 8, wherein each of the integrated LED lamps further comprises a third LED for outputting third color light, wherein the drive circuit of each of the integrated LED lamps controls an order of lighting the first LED, the second LED and the third LED according to the image data.

11. The data transmission circuit according to claim 8, wherein the voltage/current controller comprises:

a power regulator comprising an input terminal, a common-voltage terminal and an output terminal, wherein the input terminal of the power regulator is coupled to the output terminal of the power supply circuit, and the power regulator regulates a voltage of the output terminal to the common-voltage terminal into a power voltage;

a microprocessor comprising a power voltage terminal, a common-voltage terminal and a first input-output terminal, wherein the power voltage terminal of the microprocessor is coupled to the output terminal of the power regulator, and the common-voltage terminal of the microprocessor is coupled to the common-voltage terminal of the power regulator and the first power pin of the first integrated LED lamp;

an impedance adjusting circuit comprising a first terminal, a second terminal and a control terminal, wherein the control terminal of the impedance adjusting circuit is coupled to the first input-output terminal of the microprocessor, the first terminal of the impedance adjusting circuit is coupled to the output terminal of the power regulator, the second terminal of the impedance adjusting circuit is coupled to the first power pin of the first integrated LED lamp, wherein in the data receiving mode, the microprocessor outputs a control signal, and the impedance adjusting circuit adjusts an impedance between the first terminal and the second terminal of the impedance adjusting circuit according to the control signal to change a voltage/current between the first power pin and the second power pin of each of the integrated LED lamps, so that each of the integrated LED lamps performs data receiving.

12. The data transmission circuit according to claim 11, wherein the microprocessor further comprises a second input-output terminal, wherein the impedance adjusting circuit comprises:

a first resistor comprising a first terminal and a second terminal, wherein the first terminal of the first resistor is coupled to the output terminal of the power regulator;

a first switch comprising a first terminal, a second terminal and a control terminal, wherein the first terminal of the first switch is coupled to the second terminal of the first resistor, the second terminal of the first switch is coupled to the first power pin of the first integrated LED lamp, and the control terminal of the first switch is coupled to the first input-output terminal of the microprocessor;

a second resistor comprising a first terminal and a second terminal, wherein the first terminal of the second resistor is coupled to the output terminal of the power regulator; and a second switch comprising a first terminal, a second terminal and a control terminal, wherein the first terminal of the second switch is coupled to the second terminal of the second resistor, the second terminal of the second switch is coupled to the first power pin of the first integrated LED lamp, and the control terminal of the second switch is coupled to the second input-output terminal of the microprocessor.

13. An integrated LED lamp, comprising:

a first power pin coupled to a first power voltage;

a second power pin coupled to a second power voltage;

a LED package, comprising:

a first LED for outputting first color light;

a second LED for outputting second color light;

a data transmission starting circuit coupled to the first power pin and the second power pin, wherein the data transmission starting circuit detects voltages/currents of the first power pin and the second power pin;

an image memory cell, which is coupled to the data transmission starting circuit and provides image data corresponding to an address signal; and a drive circuit comprising an input port and an output port, wherein the input port of the drive circuit is coupled to the image memory cell and receives the image data, wherein the drive circuit controls an order of lighting the first LED and the second LED according to the image data, wherein when a difference between the voltages/currents of the first power pin and the second power pin reaches a threshold for a first period, the data transmission starting circuit outputs a data transmission enable signal, wherein when the difference between the voltages/currents of the first power pin and the second power pin reaches the threshold for the first period, the data transmission starting circuit enters a data receiving mode, and then when the first power pin receives a first voltage/current, the received bit data is judged as first logic, when the first power pin receives a second voltage/current, the received bit data is judged as second logic, and the data transmission starting circuit transmits the received data to the image memory cell.

14. The integrated LED lamp according to claim 13, further comprising:

a counter for performing counting to provide a count signal;

a data verifying circuit coupled to the counter and the data transmission starting circuit, wherein the data verifying circuit stores a lamp number, and the lamp number stored in the data verifying circuit of the $I^{th}$ integrated LED lamp is I;

wherein the image memory cell is coupled to the counter and the data transmission starting circuit;

wherein when the counter receives the data transmission enable signal, the counter counts;

wherein when a difference between the voltages/currents of the first power pin and the second power pin reaches the threshold for the first period, the counter of the integrated LED lamp counts, when the counter of the integrated LED lamp counts to $(K\times(I-1)+1)$, bits received by the data transmission starting circuit of the integrated LED lamp are $(K\times(I-1)+1)$ bits, the data verifying circuit of the integrated LED lamp notifies the data transmission starting circuit of the integrated LED lamp to transmit logic data from the received (K×(I−1)+1) bits to (K×I) bits to the image memory cell of the integrated LED lamp to update pattern data of the image memory cell of the integrated LED lamp;

wherein K is a total bit number of display data for the integrated LED lamp, and wherein I and K are natural numbers.

15. The integrated LED lamp according to claim 13, further comprising a third LED for outputting third color light, wherein the drive circuit controls an order of lighting the first LED, the second LED and the third LED according to the image data.

16. The integrated LED lamp according to claim 13, wherein the image memory cell is a shift register.

17. A data transmission circuit for driving N integrated LED lamps, wherein each of the integrated LED lamps comprises:

a first power pin coupled to a first power voltage;
a second power pin coupled to a second power voltage;
a LED package, comprising:
a first LED for outputting first color light;
a second LED for outputting second color light;
a data transmission starting circuit coupled to the first power pin and the second power pin, wherein the data transmission starting circuit detects voltages/currents of the first power pin and the second power pin;
an image memory cell providing image data;
a drive circuit comprising an input port and an output port, wherein the input port of the drive circuit is coupled to the image memory cell and receives the image data, wherein the drive circuit controls an order of lighting the first LED and the second LED according to the image data, wherein the first power pin of the $(I+1)^{th}$ integrated LED lamp is coupled to the second power pin of the $I^{th}$ integrated LED lamp, wherein the data transmission circuit comprises:
a power supply circuit comprising an output terminal; and
a voltage/current controller comprising an input terminal and an output terminal, wherein the input terminal of the voltage/current controller is coupled to the output terminal of the power supply circuit, and the output terminal of the voltage/current controller is coupled to the first power pin of the first integrated LED lamp, wherein the voltage/current controller selectively outputs a first voltage/current and a second voltage/current to the N integrated LED lamps, wherein in a normal mode, the voltage/current controller outputs the first voltage/current to drive the N integrated LED lamps, wherein in a data receiving mode, the voltage/current controller continuously outputs the second voltage/current in a first period to notify the data transmission starting circuits of the N integrated LED lamps to enter the data receiving mode, and then when to-be-transmitted bit data is first logic, the voltage/current controller outputs the second voltage/current in a first period of a clock period and the voltage/current controller outputs the first voltage/current in a second period of the clock period, when the transmitted bit data is second logic, the voltage/current controller outputs the first voltage/current in the first period of the clock period and the voltage/current controller outputs the second voltage/current in the second period of the clock period, wherein N and I are natural numbers, and 0<I<=N.

18. An integrated LED lamp, comprising:
a first power pin coupled to a first power voltage;
a second power pin coupled to a second power voltage;
a LED package, comprising:
a first LED for outputting first color light;
a second LED for outputting second color light;
a data transmission starting circuit coupled to the first power pin and the second power pin, wherein the data transmission starting circuit detects voltages/currents of the first power pin and the second power pin;
an image memory cell, which is coupled to the data transmission starting circuit and provides image data corresponding to an address signal; and
a drive circuit comprising an input port and an output port, wherein the input port of the drive circuit is coupled to the image memory cell and receives the image data, wherein the drive circuit controls an order of lighting the first LED and the second LED according to the image data, wherein when a difference between the voltages/currents of the first power pin and the second power pin reaches a threshold for a first period, the data transmission starting circuit outputs a data transmission enable signal, wherein when the difference between the voltages/currents of the first power pin and the second power pin reaches the threshold for the first period, the data transmission starting circuit enters a data receiving mode, and then, in each of a clock period, the transmission starting circuit detects a variation of the voltage/current, wherein the received bit data is judged as first logic when the first power pin receives a first voltage/current in a first period of a clock period, and the first power pin receives a second voltage/current in a second period of the clock period, wherein the received bit data is judged as second logic when the first power pin receives the second voltage/current in the first period of the clock period, and the first power pin receives the first voltage/current in the second period of the clock period, wherein the data transmission starting circuit transmits the received data to the image memory cell.

* * * * *